United States Patent [19]

Reinshagen et al.

[11] 3,975,322

[45] Aug. 17, 1976

[54] RAPID DRYING EPOXY RESIN ESTER

[75] Inventors: H. Alan Reinshagen, Greensburg; Leonard E. Edelman, Pittsburgh, both of Pa.

[73] Assignee: Westinghouse Electric Corporation, Pittsburgh, Pa.

[22] Filed: Sept. 30, 1974

[21] Appl. No.: 510,824

[52] U.S. Cl. ............................ 260/18 EP; 106/14; 106/252; 106/253; 106/254; 106/259; 260/33.6 EP; 260/37 EP
[51] Int. Cl.² ...................... C08L 91/00; C09D 5/08
[58] Field of Search ..... 260/18 EP, 37 EP, 33.6 EP; 106/14, 252, 253, 254, 259

[56] References Cited
UNITED STATES PATENTS

| | | | |
|---|---|---|---|
| 3,219,602 | 11/1965 | Scheibli | 260/18 EP |
| 3,364,178 | 1/1968 | Kreps | 260/49 |
| 3,393,171 | 7/1968 | Vogt | 260/30.4 |
| 3,553,119 | 1/1971 | Wright | 260/18 |
| 3,823,107 | 7/1974 | Cotton | 260/23.7 N |
| 3,829,395 | 8/1974 | Goodell | 260/22 A |

*Primary Examiner*—Christopher A. Henderson, Jr.
*Attorney, Agent, or Firm*—R. D. Fuerle

[57] ABSTRACT

A diglycidyl ether of a diphenol, such as a diglycidyl ether of bisphenol A, is reacted with bisphenol S to form a chain-extended epoxy resin. This chain-extended epoxy resin is then esterified with a fatty acid derived from a drying oil, such as linseed oil fatty acid. The resulting epoxy resin ester is cut with a solvent for use as a rapid drying coating material. A primer using this material is also disclosed.

12 Claims, No Drawings

RAPID DRYING EPOXY RESIN ESTER residue of a diphenol (i.e., R is a diphenol minus its two hydroxy groups). For example, the formula for the diglycidyl ether of bisphenol A is:

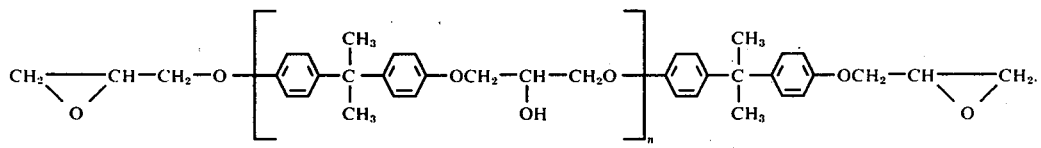

BACKGROUND OF THE INVENTION

In manufacturing various articles which require an epoxy coating, it is desirable that the coating, once applied, dry quickly so that the epoxy does not drip and the articles can be used or packaged immediately without first standing for long periods in a special drying room.

Epoxy resins which are chain-extended with bisphenol A require drying times of about 6 to 10 hours. Styrenated epoxies, made by esterifying an epoxy resin with the reaction product of styrene and a fatty acid (see U.S. Pat. No. 2,909,497), do dry rapidly, but are not very compatible with resins such as butylated urea and butylated melamine which are reacted with epoxies to give them a very hard, scratch-resistant surface. The styrenated epoxy resins will tolerate only about 5 to 10% of a butylated urea or melamine resin and therefore the degree of hardness that can be imparted to a styrenated epoxy resin is limited. Also, the salt spray resistance of styrenated epoxies is not as high as is sometimes desired.

PRIOR ART

U.S. Pat. No. 3,364,178 discloses the use of bisphenol S to chain-extend a diglycidyl ether of bisphenol A.

U.S. Pat. No. 3,219,602 and Canadian Pat. No. 714,605 disclose the reaction of a diglycidyl ether of bisphenol A with a drying oil derived fatty acid.

SUMMARY OF THE INVENTION

We have discovered that if a diglycidyl ether of a diphenol is chain-extended with bisphenol S then esterified with a fatty acid derived from a drying oil, the resulting epoxy resin ester will dry very rapidly, much more rapidly than a comparable ester with bisphenol A substituted for the bisphenol S.

Moreover, we have prepared paint primers from our epoxy resin ester and have found that they exhibit greater salt spray resistance than do the styrenated epoxy resins.

DESCRIPTION OF THE INVENTION

The Diphenol

The diglycidyl ether of a diphenol has the general formula:

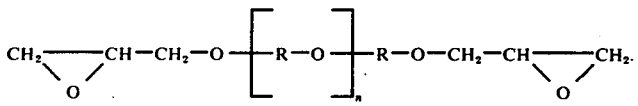

where n is an average of about 0 to about 1. Values of n in excess of an average of about 1 are to be avoided as they increase the drying time of the resin. R is the The diglycidyl ether of a diphenol can be prepared by reacting a diphenol with epichlorohydrin in the presence of sodium hydroxide. Examples of suitable diphenols include bis(4-hyroxphenyl) methylphenylmethane, bis(4-hydroxphenyl) methane, 3,3'- and 4,4'-dihyroxydiphenyl, hydroquinone, resorcinol, dihydroxy diphenoxy ethanes, and dihydroxynaphthalene. The preferred diglycidyl ether of a diphenol is the diglycidyl ether of bisphenol A because it is commercially available and less expensive. Mixtures of diglycidyl ethers of diphenols can also be used.

Bisphenol S

Bisphenol S is dihydroxy diphenyl sulfone

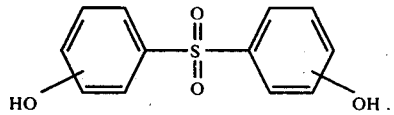

The bisphenol S is preferably at least about 95% (all percentages herein are by weight) p,p'-dihydroxy diphenyl sulfone since if more than about 5% m,p'-dihydroxy diphenyl sulfone or m,m'-dihydroxy diphenyl sulfone (or both) are present the viscosity of the epoxy resin ester in solution is higher, which means that solutions of high solids content are very viscous and difficult to work with.

FATTY ACID

The fatty acid is derived from a drying oil, usually by saponifying the drying oil. Drying oils are a well-known class of naturally-occurring substances which can be described as mixtures of triglycerides of various diunsaturated monocarboxylic acids. Generally, some of the triglycerides have conjugated unsaturation. Also, some mono- and tri-unsaturation may be present.

Examples of suitable drying oils from which the fatty acid can be derived include linseed oil, safflower oil, soya oil, dehydrated castor oil, fish oil, perilla oil, and oiticica oil. The preferred drying oil is linseed oil as it represents the best balance of cost and drying properties, although dehydrated castor oil is a more rapidly drying oil. Mixtures of fatty acids can also be used to obtain properties which individual fatty acids do not possess.

SOLVENT

The epoxy resin ester is soluble in a wide range of solvents, but not in water or most aliphatic hydrocarbons. Many common aromatic solvents may be used, including ketones such as methyl isobutyl ketone, alcohols such as cellosolve, esters such as cellosolve acetate and aromatic hydrocarbons such as xylene and toluene. Xylene is preferred as it is inexpensive. Mixtures of solvents can also be used.

CATALYST

Although not necessary, it is preferable to use a catalyst for the reaction of the diglycidyl ether of a diphenol with bisphenol S in order to increase the speed of the reaction. Suitable catalysts include quaternary ammonium salts, lime, lithium hydroxide, lithium ricinoleate, and sodium hydroxide.

The preferred catalyst is methyl tributyl phosphonium dimethyl sulfate as it has been found to work well and it is reputed to initiate fewer side reactions.

The amount of catalyst used depends upon the particular catalyst selected. For example, phosphonium salts are used at about 0.025 to about 0.2%, lithium hydroxide at about 0.1 to about 0.5%, lime at about 0.5 to about 1%, lithium ricinoleate at about 0.3 to about 1.0%, and sodium hydroxide at about 0.2 to about 0.5%.

METHOD OF PREPARATION

The chain-extended epoxy resin is prepared by mixing together a diglycidyl ether of a diphenol and bisphenol S in proportions given by the formula:

$$X = (100) \frac{E_D (125 + E_R)}{E_R (125 + E_D)}$$

where $E_R$ is the desired epoxy equivalent weight (EEW) of the chain-extended resin and $E_D$ is the EEW of the diglycidyl ether of a diphenol. The percent of diglycidyl ether of a diphenol is X and the percent of bisphenol S is 100-X. (The value "125" in the equation is the hydroxyl equivalent weight of bisphenol S).

Generally, the desired EEW of the chain-extended resin will be in the range of about 600 to about 2000. The actual EEW of the chain-extended resin is usually somewhat higher than the above equation predicts, though not significantly so.

The mixture of the bisphenol S and the diglycidyl ether of a diphenol are heated until an exotherm occurs at about 150° or 155°C. The exotherm typically peaks at about 175° to 200°C. Then about 25 to about 50% (based on total solids including the fatty acid) of a fatty acid is added. If less than about 25% fatty acid is used the resin does not cure completely and therefore is structurally weak and exhibits poor solvent resistance. If more than about 50% fatty acid is used the drying time of the resin is lengthened too much.

The mixture with the fatty acid is heated to about 210° to 220°C. or even higher, until the acid number drops below about 5. The mixture is cooled to about 140°C or lower. It can be cooled to room temperature and stored for use later, but it is more convenient to form a solution as this eliminates grinding up the solid resin. The amount of solvent used depends upon the viscosity desired. A solution of about 40° to about 60° solids has a high solids content yet is not unmanageably viscous, and is suitable as a vehicle for primers, paints, and other uses. A solution of the epoxy resin ester can also be used as an insulating varnish or as a conformal coating for printed circuit boards. The solution can be applied by brushing, spraying, roll coating, dipping, or other means. As the solvent evaporates and the fatty acid portion of the resin absorbs oxygen the coating rapidly becomes dry, where "dry" means dry to the touch and "rapidly" means in less than about ten minutes.

The preparation of the chain-extended epoxy resin is believed to occur according to the following equation:

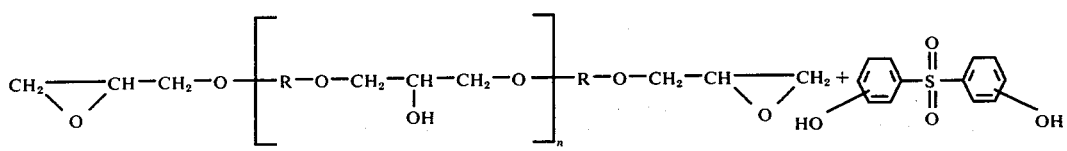

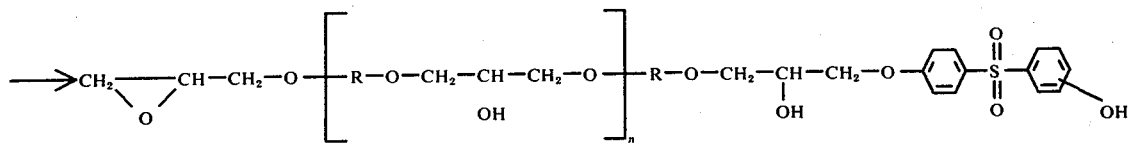

and the reaction continues at both ends of the chain.

The preparation of the epoxy resin ester from the chain-extended epoxy resin is believed to occur by reaction of the fatty acid with the hydroxyl group in the chain according to the following equation:

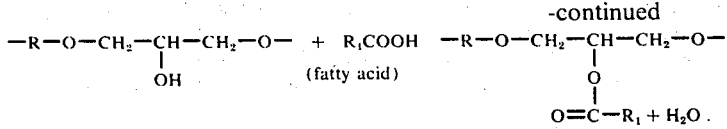

A harder, more scratch resistant epoxy resin can be prepared by mixing about 70 to about 85% of the epoxy resin ester (in solution, at about 40 to about 60% solids) with about 15 to about 30% butylated urea, butylated melamine, or mixtures thereof. Such mixtures can be cured by heating a cast film for about one-half hour at about 135° to about 160°C. Butylated urea and butylated melamine can be prepared by reacting urea or melamine with formaldehyde in the presence of butyl alcohol as is known in the art.

PRIMER

A primer can be prepared from the epoxy resin ester which is useful as a first coat under paints, as temporary protection for parts stored prior to painting, for improving the corrosion resistance of finishing systems, etc.

The primer generally comprises about 30 to about 50% pigment and about 50 to about 70% of a vehicle for the pigment. At less than about 30% pigment the primer tends to be too glossy and adhesion of the top coat is poorer. At more than about 50% pigment the primer tends to develop settling problems.

The pigment generally comprises about 25 to about 35% opacity agent, about 15 to about 25% corrosion inhibitor, and about 45 to about 55% extender pigment.

The opacity agent performs the function of covering the substrate and if less than about 25% is used the substrate may not be covered adequately. On the other hand more than about 35% is usually an unnecessary expense. The opacity agent is generally some type of iron oxide.

At less than about 15% the corrosion inhibitor may lose effectiveness and more than about 25% is usually unnecessary. While zinc chromate is preferred as the most effective practical corrosion inhibitor, lead silica chromate and other corrosion inhibitors could be used.

The pigment extender is used at at least 45% as less may cause glossiness and poor adhesion of the top coat. At more than about 55% settling may occur. Magnesium silicate is preferred as it provides good adhesion and does not settle readily. Clay, calcium carbonate, silica, and other materials could also be used.

The vehicle for the pigment generally comprises about 35 to about 45% of the epoxy resin ester, about 55 to about 65% aromatic solvent, and about 1 to about 2% liquid dryer. At less than about 35% resin poor binding within the primer may occur and at more than about 45% the cost of the primer may be too high and it could exhibit glossiness and poor adhesion of the top layer. At less than about 1% liquid dryer the primer may require too long to dry and at more than about 2% the film may wrinkle. Xylene is the preferred solvent and cobalt or lead naphthenate are preferred dryers, although other solvents and dryers can be used.

The following examples further illustrate this invention:

EXAMPLE 1

A flask fitted with a stirrer, heating mantle, and a thermometer was charged with 144g bisphenol S and 336g of a liquid diglycidyl ether of a diphenol (EEW = 185 to 195), sold by Shell Chemical Co. under the trademark "Epon 828." One gram of methyltributylphosphonium dimethyl sulfate was added as a catalyst. The temperature was raised rapidly to 155°C at which temperature an exotherm occurred which peaked at 180°C. The EEW of a sample of the resin was determined to be about 885. The temperature was allowed to drop to 170°C whence 320g raw linseed fatty acid were added. Heat was again applied and the temperature rose to 210° to 220°C. After about 9 hours at this temperature, the acid value dropped to about 4. The batch was cooled to 140°C and cut with xylene to 50% solids. The solution was spread on a glass plate with a doctor blade to about 1 mil dry thickness and was dry to the touch in about 5 minutes.

For comparison, a bisphenol A epoxy resin ester was prepared using a diglycidyl ether of bisphenol A sold by Shell Oil Co. under the trademark "Epon 1004" (EEW = 875 to 1025). The Epon 1004 resin is a bisphenol A chain-extended epoxy resin. It was chosen because its EEW is equivalent to the EEW obtained for the bisphenol S chainextended epoxy resin.

A mixture of 60% Epon 1004 resin and 40% linseed fatty acid was prepared and heated at 230°C until the acid value dropped below 5. The resin was cut with xylene to 50% solids and 0.06% cobalt naphthenate (based on vehicle solids) was added to shorten the drying time. Nevertheless, when the solution was spread on a glass plate between 6 and 8 hours were required before it was dry to the touch.

EXAMPLE 2

A primer was prepared using the bisphenol S epoxy resin ester prepared in Example 1 according to the formulation:

|  | lbs. |
|---|---|
| Red iron oxide (corrosion resistent pigment) | 1.5 |
| Pigment extender (sold by Diamond Shamrock under the trademark "Surfex") | 0.5 |
| Leuthin surfactant | 0.0125 |
| Bisphenol S epoxy resin ester (50% solids) | 3.5 |
| Xylene | 0.38 |
| 6% cobalt naphthenate in mineral spirits | 0.016 |
| Anti-skinning agent | 0.0125 |

Phosphated steel panels about 3 by about 5 inches were coated with the primer. The coating dried in less than 10 minutes to form a film 2 mils thick.

For comparison phosphated steel panels were also coated with a styrenated epoxy resin prepared according to Example 1 of U.S. Pat. No. 2,909,497. The coating dried in less than 10 minutes to form a film about 2 mils thick.

Both sets of panels were placed in a salt fog cabinet at 15° to vertical. The temperature was maintained at 95°F. whilst the panels were subjected to a salt fog from a 5% salt solution for 336 hours. The styrenated epoxy panels exhibited some minute blisters and moderate rusting. The bisphenol S epoxy resin ester panels exhibited no blistering and no rusting.

We claim:
1. A rapid drying epoxy resin ester comprising:
the reaction product of
A. about 25 to about 50% (based on total solids) of a drying oil-derived fatty acid; and
B. chain-extended epoxy resin consisting of the reaction product of
  1. diglycidyl ether of a diphenol; and
  2. bisphenol S, where the percentage of diglycidyl ether of a diphenol in said chain-extended epoxy resin is X and the percentage of bisphenol S in said chain-extended epoxy resin is 100-X, where

$$X = (100) \frac{E_D(125) + E_R}{E_R(125 + E_D)}$$

and $E_R$ is between about 600 and about 2000 and $E_D$ is the epoxy equivalent weight of said diglycidyl ether of a diphenol.

2. An epoxy resin ester according to claim 1 wherein said fatty acid is derived from linseed oil.
3. An epoxy resin ester according to claim 1 wherein said diglycidyl ether of a diphenol is a diglycidyl ether of bisphenol A.
4. An epoxy resin ester according to claim 1 in a solution of about 40 to about 60% solids.
5. An epoxy resin ester according to claim 4 wherein said solution is in xylene.
6. An epoxy resin ester according to claim 4 hardened with about 15 to about 30% of a compound selected from the group consisting of butylated urea, butylated melamine, and mixtures thereof.
7. An epoxy resin ester according to claim 1 wherein at least about 95% of said bisphenol S is p,p'-dihydroxy diphenyl sulfone.
8. A primer comprising about 30 to about 50% of a pigment and about 50 to about 70% of a vehicle for said pigment, said vehicle comprising a solution of an epoxy resin ester according to claim 1.
9. A primer comprising:
A. about 30 to about 50% of a pigment which comprises:
  1. about 25 to about 35% of an opacity agent;
  2. about 15 to about 25% of a corrosion inhibitor; and
  3. about 45 to about 55% of a pigment extender; and
B. about 50 to about 70% of a vehicle for said pigment which comprises:
  1. about 35 to about 45% of an epoxy resin ester according to claim 1;
  2. about 55 to about 65% of an aromatic solvent; and
  3. about 1 to about 2% of a liquid dryer.
10. A prime according to claim 9 wherein said opacity agent is an iron oxide, said corrosion inhibitor is zinc chromate, and said pigment extender is magnesium silicate.
11. A primer according to claim 9 wherein said aromatic solvent is xylene and said liquid dryer is selected from the group consisting of cobalt naphthenate, lead naphthenate, and mixtures thereof.
12. An epoxy resin ester according to claim 1 wherein said diglycidyl ether of a diphenol has the general formula

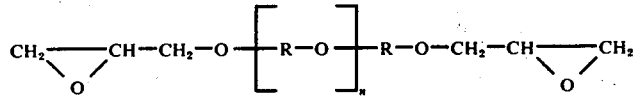

where $n$ is an average of about 0 to about 1, and R is the residue of a diphenol.

* * * * *